US009853556B2

(12) United States Patent
Lin et al.

(10) Patent No.: US 9,853,556 B2
(45) Date of Patent: Dec. 26, 2017

(54) ISOLATED POWER CONVERSION SYSTEM

(71) Applicant: INNO-TECH CO., LTD., Taipei (TW)

(72) Inventors: Shu-Chia Lin, Taipei (TW); Ching-Yuan Lin, Taipei (TW); Wen-Yueh Hsieh, Taipei (TW); Chih Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 15/221,817

(22) Filed: Jul. 28, 2016

(65) Prior Publication Data
US 2017/0214322 A1    Jul. 27, 2017

(30) Foreign Application Priority Data
Jan. 21, 2016 (TW) .............................. 105101882 A

(51) Int. Cl.
*H02M 7/217* (2006.01)
*H02M 3/335* (2006.01)
*H02M 1/42* (2007.01)
*H02M 1/00* (2006.01)

(52) U.S. Cl.
CPC ..... *H02M 3/33576* (2013.01); *H02M 1/4258* (2013.01); *H02M 2001/0009* (2013.01)

(58) Field of Classification Search
CPC ............... H02M 7/4807; H02M 5/453; H02M 3/33523; H02M 2001/0032; H02M 3/33592; Y02B 70/1491; H05B 33/0815

USPC ....... 363/16, 17, 21.04, 21.08, 21.12, 21.16, 363/71, 98, 127; 315/224, 225, 247
See application file for complete search history.

(56) References Cited

U.S. PATENT DOCUMENTS

| 5,321,596 | A  | * | 6/1994  | Hurst    | H02M 7/4807 363/127 |
| 5,424,932 | A  | * | 6/1995  | Inou     | H02M 3/33561 363/127 |
| 8,374,003 | B2 | * | 2/2013  | Matsumoto| H02M 3/33592 363/21.01 |
| 8,699,243 | B2 | * | 4/2014  | Sims     | H02M 3/33592 363/21.14 |
| 8,885,364 | B2 | * | 11/2014 | Wang     | H02M 3/33523 363/21.15 |
| 9,167,644 | B2 | * | 10/2015 | Kunst    | H05B 33/0815 |
| 9,608,526 | B2 | * | 3/2017  | Okura    | H02J 5/005 |

* cited by examiner

*Primary Examiner* — Rajnikant Patel
(74) *Attorney, Agent, or Firm* — Lin & Associates Intellectual Property, Inc.

(57) ABSTRACT

Disclosed is an isolated power conversion system for providing a function of isolated power conversion by converting an AC power into a DC output power, and a rectifying unit, a transformer, a switching transistor, a first pulse width modulation (PWM) controller, a second PWM controller, an output unit and a signal blocking unit are included. The signal blocking unit is employed as a connection interface between the first and second PWM controllers to provide digital signal for communication. Noise margin and stability of electrical operation are improved to avoid malfunction. Overall, the present invention greatly enhances stability of power conversion and secures quality of electrical signal.

5 Claims, 6 Drawing Sheets

ISOLATED POWER CONVERSION SYSTEM

CROSS-REFERENCE TO RELATED APPLICATION

This application claims the priority of Taiwanese patent application No. 105101882, filed on Jan. 21, 2016, which is incorporated herewith by reference.

BACKGROUND OF THE INVENTION

1. Field of the Invention

The present invention generally relates to an isolated power conversion system, and more specifically to an isolated power conversion system provided with at least one digital PWM controller at the primary and/or the secondary side performing a preset power control function based on actual application, receiving/transmitting a digital signal like a detected voltage or current of the secondary side back to the primary side so as to control the switching transistor at the primary side, or inverting the PWM signal to generate and transmit an inverted PWM signal to the secondary side to synchronously control the switching transistor, thereby enhancing stability of power conversion and greatly improving quality of electrical signal.

2. The Prior Arts

Various electronic products need specific power with different voltage or current to correctly operate. For example, general integrated circuits (ICs) need 5V or 3V, electric motors require 12V DC power, but for lamps of LCD monitors, much higher voltage like 115V is just sufficient. Thus, it is greatly needed for suitable power converters to meet the requirements of actual applications, and technology of power conversion has been developed and becomes an essential part of the electronic industry.

In general, technology of power conversion is roughly classified by two types: isolated and non-isolated. The isolated power conversion separates the input power and the load to prevent the loading device from damage due to abnormal surge current resulted from the input power. Therefore, the isolated power conversion is substantially safer and the circuit design is simpler. In contrast, the non-isolated power conversion induces more concerns and usually needs to meet more severe regulation for the sake of safety.

Refer to FIG. 1 illustrating the isolated power conversion system in the prior arts. An AC power is rectified, filtered and then transmitted to a primary coil of a transformer TR. A drain of a driving switching transistor Q1 is connected to the primary coil, and a source of the transistor Q1 is connected to a sensing resistor to generate a sensing signal. In addition, an induction voltage is generated by a secondary coil of the transformer TR due to induction of a current flowing through the primary coil, and transmitted to an output unit for further filtration and rectification. The output unit then generates an output power Vo to supply an external load.

In particular, a PWM (pulse width modulation) controller U1 generates a PWM driving signal to control a gate of the transistor Q1, thereby controlling the operation of turning on/off the transistor Q1. Further, a photocoupler is connected to the output unit, generates and transmits a feedback signal to the PWM controller U1 so as to achieve isolation for power conversion.

Further refer to FIG. 2 illustrating another isolated power conversion system in the prior arts. The isolated power conversion system in FIG. 2 is similar to the system in FIG. 1, and the photocoupler U2 is also used to generate the feedback signal for the PWM controller U1. However, one difference is that a constant-voltage-constant-current controller U3 is employed to control the load consisting of LEDs connected in series for a feature of constant voltage and constant current so as to maintain light quality and prolong lifetime of the LEDs.

Obviously, one drawback of the above isolated power conversion system in the prior arts is that the feedback signal generated by the photocoupler U2 is an analog signal and easily interfered by external electrical noise such that noise margin is poor. Stability of overall electrical operation is adversely affected.

Therefore, it is greatly needed to provide a new isolated power conversion system employing a signal blocking unit as a connection interface between a first PWM controller and a second PWM controller to implement digital communication so as to enhance ability of resisting noise, improve stability of electrical operation, avoid malfunction and secure signal quality, thereby overcoming the above problems in the prior arts.

SUMMARY OF THE INVENTION

The primary objective of the present invention is to provide an isolated power conversion system for providing a function of isolated power conversion by converting an AC power into a DC output power. The isolated power conversion system of the present invention generally comprises a rectifying unit, a transformer, a switching transistor, a first pulse width modulation (PWM) controller, a second PWM controller, an output unit and a signal blocking unit. The rectifying unit is used to transform the AC power into a DC power.

Specifically, the transformer substantially comprises a primary coil, an auxiliary coil and a secondary coil. The primary coil receives the DC power, and the auxiliary coil generates an auxiliary induced current by induction of a current flowing through the primary coil. The auxiliary induced current further flows through a serial resistor and generates an auxiliary signal. The secondary coil similarly generates a secondary induced current by induction of the current of the primary coil.

The switching transistor has a drain, a gate and a source. The drain is connected to the primary coil, the gate connected to an end of a sensing resistor, and another end of the sensing resistor grounded. Additionally, the source generates a sensing signal.

Moreover, the output unit comprises an output transistor, an output diode and an output capacitor. A positive end of the output diode is connected to a drain of the output transistor and an end of the output capacitor, a negative end of the output diode connected to a source of the output transistor, another end of the output capacitor connected to the secondary coil, and the output capacitor connected to a load in parallel for generating an output power.

More specifically, the first PWM controller has a first end, a second end, a third end, a fourth end, a transmit end and a receive end. The first end is floating, the second end is connected to the gate of the switching transistor through a driving serial resistor, the third end receives the auxiliary signal, and the fourth end is connected to the source of the switching transistor through a sensing serial resistor for receiving the sensing signal.

Similar to the first PWM controller, the second PWM controller has a first end, a second end, a third end, a fourth end, a transmit end and a receive end. The first end is connected to the negative end of the output diode, but the second end is connected to the gate of the output transistor. The third end is connected to the positive end of the output diode, and the fourth end connected to the load.

The signal blocking unit is connected between the first and second PWM controllers, and specifically implemented by a signal sensing coil provided in the transformer to perform bi-directional signal communication for the primary and secondary coils.

Particularly, the first PWM controller performs a first control process based on the sensing signal and the auxiliary signal to generate a driving signal with a PWM feature, the second end of the first PWM controller transmits the driving signal to the gate of the switching transistor to drive the switching transistor, the first PWM controller generates a first digital output signal, and the transmit end of the first PWM controller transmits the first digital output signal to the receive end of the second PWM controller through the signal blocking unit. Further, the second PWM controller performs a second control process based on electrical signals from the first, second, third and fourth ends of the first PWM controller so as to generate a secondary coil adjust signal, the third end of the second PWM controller transmits the secondary coil adjust signal to the gate of the output transistor, the second PWM controller generates a second digital output signal, and the transmit end of the second PWM controller transmits the second digital output signal to the receive end of the first PWM controller through the signal blocking unit.

Therefore, the present invention utilizes the signal blocking unit as the connection interface between the first and second PWM controllers to implement digital communication so as to enhance ability of resisting noise and improve stability of electrical operation.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 3:
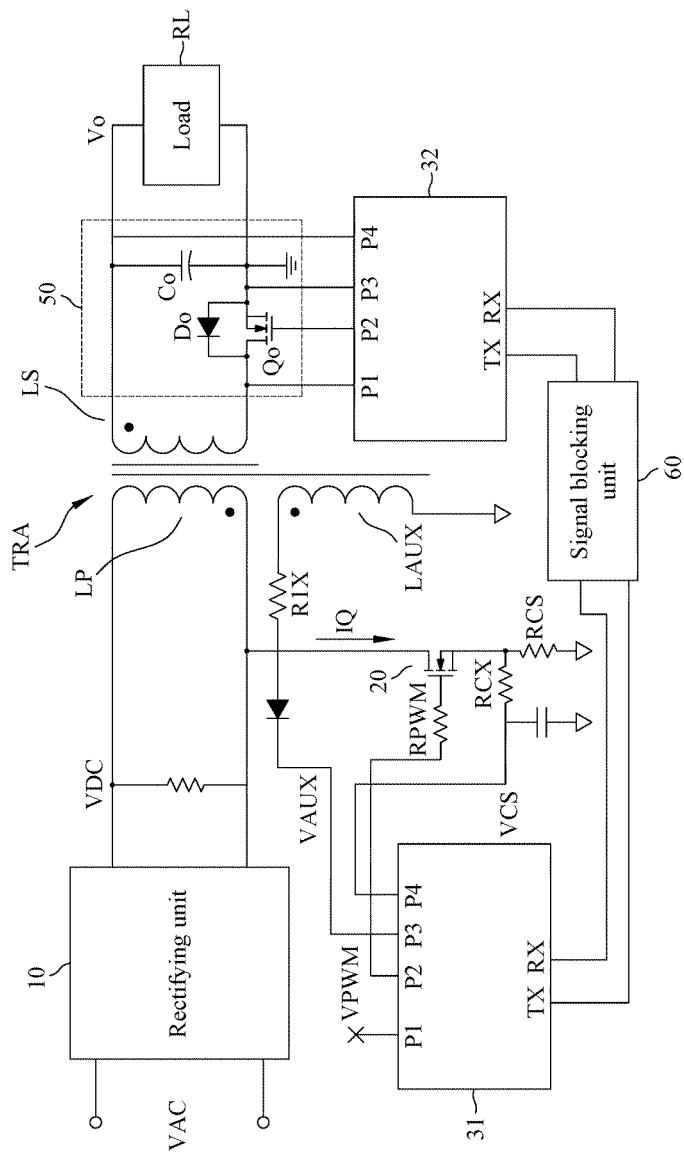
FIG. 3 is the isolated power conversion system according to one embodiment of the present invention.

Please refer to FIG. 3 illustrating the isolated power conversion system according to one embodiment of the present invention. As shown in FIG. 3, the isolated power conversion system of the present invention comprises a rectifying unit 10, a transformer TRA, a switching transistor 20, a first PWM controller 31, a second PWM controller 32, an output unit 50 and a signal blocking unit 60 to implement the function of isolated power conversion.

The rectifying unit 10 is used to transform the AC power VAC into a DC power VDC. It should be noted that the rectifying unit 10 can be implemented by a traditional bridge rectification device, but it is not intended to limit the scope of the present invention. In other words, other types of rectification electronic devices are also included in the present invention.

The transformer TRA substantially comprises a primary coil LP, an auxiliary coil LAUX and a secondary coil LS. The primary coil LP is configured to receive the DC power VDC, and the auxiliary coil LAUX generates an auxiliary induced current by induction of a current flowing through the primary coil LP. The auxiliary induced current further flows through a serial resistor R1X and generates an auxiliary signal VAUX. In addition, a secondary induced current is generated by the secondary coil LS due to induction of the current of the primary coil, and then transmitted to the output unit 50.

Specifically, the switching transistor 20 is a MOS (metal-oxide-semiconductor) transistor with a drain, a gate and a source or a BJT (bipolar junction transistor) with a collector, a base and an emitter. To clearly explain the aspects of the present invention, the switching transistor 20 is implemented by the MOS transistor herein after. In other words, the drain, gate and source of the switching transistor 20 in the following description are identical to the collector, base and emitter, respectively. The drain is connected to the primary coil LP, the gate connected to an end of a sensing resistor RCS, and another end of the sensing resistor RCS grounded. A connection point of the source and the sensing resistor RCS generates a sensing signal VCS.

The output unit 50 comprises an output transistor Qo, an output diode Do and an output capacitor Co. A positive end of the output diode Do is connected to a drain of the output transistor Qo and an end of the output capacitor Co, a negative end of the output diode Do connected to a source of the output transistor Qo, another end of the output capacitor Co connected to the secondary coil, and the output capacitor Co connected to a load RL in parallel for generating an output power Vo.

The signal blocking unit 60 is specifically implemented by a signal sensing coil provided in the transformer TRA and connected between the first PWM controller 31 and the second PWM controller 32 so as to perform bi-directional signal communication for the primary coil LP and the secondary coil LS.

More specifically, the first PWM controller 31 has a first end P1, a second end P2, a third end P3, a fourth end P4, a transmit end TX and a receive end RX. The first end P1 is floating, and the second end P2 is connected to the gate of the switching transistor 20 through a driving serial resistor RPWM. The third end P3 receives the auxiliary signal VAUX, and the fourth end P4 is connected to the source of the switching transistor 20 through the sensing serial resistor RCS. Additionally, similar to the first PWM controller 31, the second PWM controller 32 has a first end P1, a second end P2, a third end P3, a fourth end P4, a transmit end TX and a receive end RX. However, the first end P1 is connected to the negative end of the output diode Do, the second end P2 connected to the gate of the output transistor Qo, the third end P3 connected to the positive end of the output diode Do, and the fourth end P4 connected to the load RL.

In particular, the first PWM controller 31 generates a digital output signal at the transmit end TX, which is then transmitted to the receive end RX of the second PWM controller 32 through the signal blocking unit 60. Similarly, the transmit end TX of the second PWM controller 32 generates another digital output signal, which is then transmitted to the receive end RX of the first PWM controller 31 through the signal blocking unit 60. Thus, the signal blocking unit 60 serves as the connection interface of the first PWM controller 31 and the second PWM controller 32 implements digital communication by use of the signals in a digital form, thereby greatly enhancing ability of resisting noise.

Figure 4:
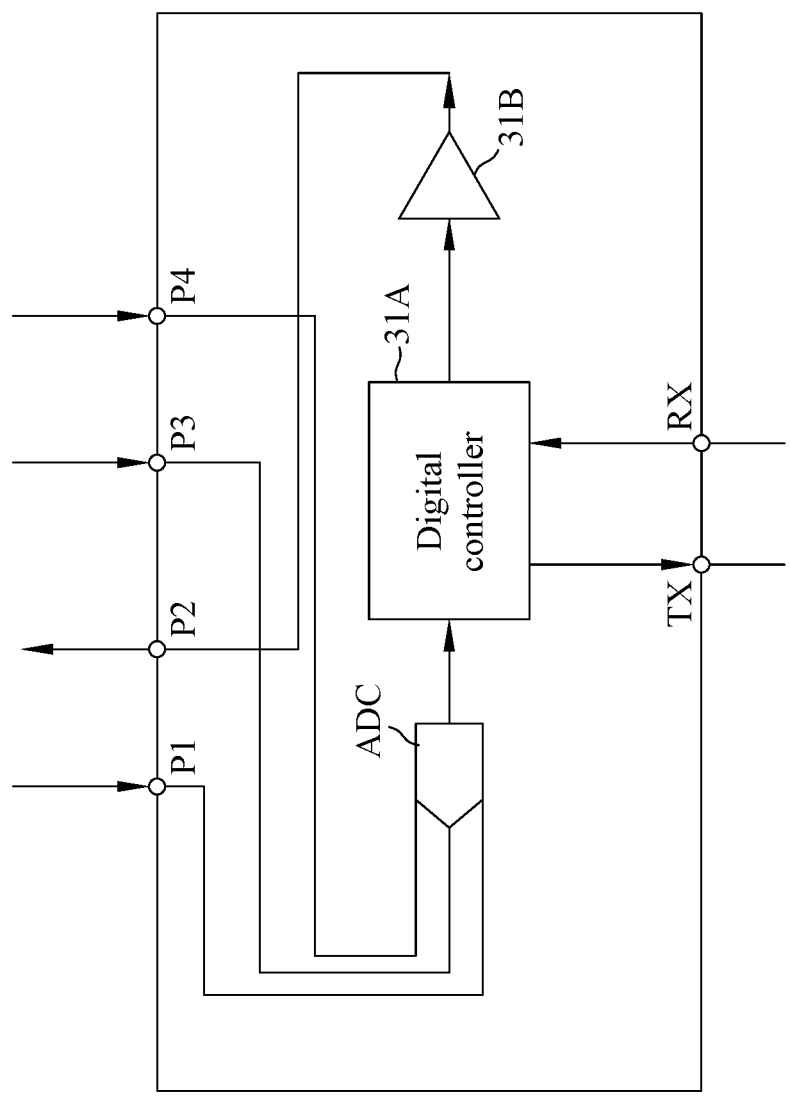
FIG. 4 is a functional block diagram showing the first PWM controller according to the present invention.

Refer to FIG. 4 showing a functional block diagram of the first PWM controller 31 according to the present invention. The first PWM controller 31 comprises a digital controller 31A, a PWM driver 31B and an analog-to-digital converter (ADC). It should be noted that the second PWM controller 32 has the same functional blocks as shown in FIG. 4, and preferably, the digital controller 31A is implemented by an electronic device like a CPU (central processing unit) or a MCU (microcontroller), which executes software of firmware program.

The digital controller 31A is electrically connected to the PWM driver 31B and the ADC, receives a digital input signal from the receive end RX of the first PWM controller 31 and transmits the digital input signal via the transmit end TX of the first PWM controller 31. The digital controller 31A is configured to convert analog signals from the first end P1, the third end P3 and the fourth end P4 connected to the ADC into corresponding digital signals, which are provided to the digital controller 31A to generate a digital PWM driving signal. The digital PWM driving signal is received by an input end of the PWM driver 31B such that the PWM driver 31B generates and transmits an analog driving signal corresponding to the digital PWM driving signal to the second end P2 of the first PWM controller 31 through an output end of the PWM driver 31B.

Return to FIG. 3. While the first PWM controller 31 and the second PWM controller 32 have the same function blocks, different electrical functions are provided, respectively, in the overall system of the present invention. Specifically, one of the primary features of the first PWM controller 31 is to generate the driving signal VPWM to control the turning on/off operation of the switching transistor 20, thereby implementing primary side regulation (PSR). The third end P3 receives the auxiliary signal VAUX of the auxiliary end AUX to detect the output voltage/current, and the fourth end P4 receives the sensing signal VCS to detect the current of the primary coil LP and generate the digital signal as a primary side state signal, which is transmitted to the signal blocking unit 60 via the transmit end TX. In other words, the first PWM controller 31 performs a first control process based on the sensing signal VCS and the auxiliary signal VAUX to generate the driving signal VPWM with a PWM feature, the second end P2 of the first PWM controller 31 transmits the driving signal VPWM to the gate of the switching transistor 20 to drive the switching transistor 20, the first PWM controller 31 generates and transmits a first digital output signal to the receive end RX of the second PWM controller 32 through the transmit end TX of the first PWM controller 31 and the signal blocking unit 60.

Figure 1:
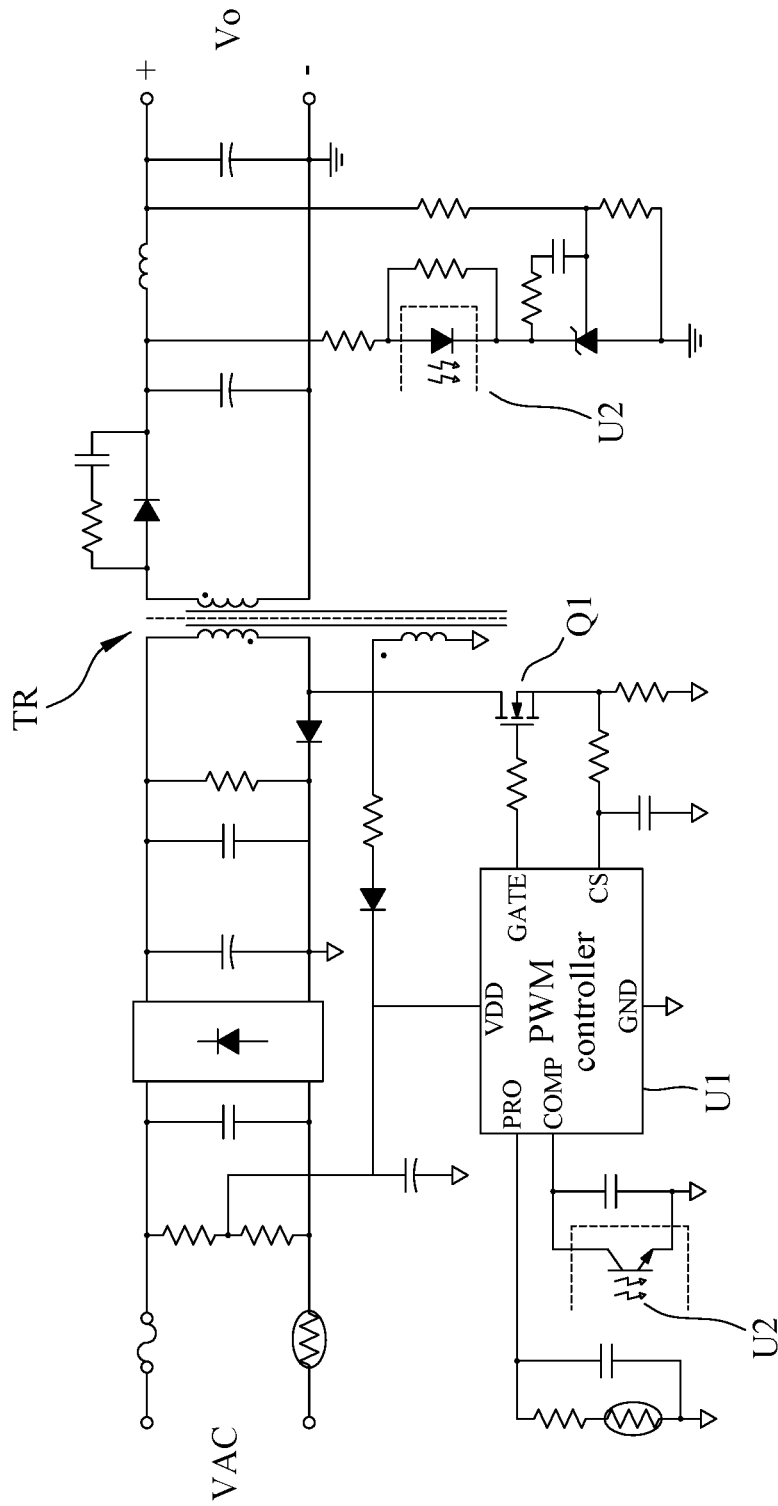
FIG. 1 is an illustrative view showing the isolated power conversion system in the prior arts.
Figure 2:
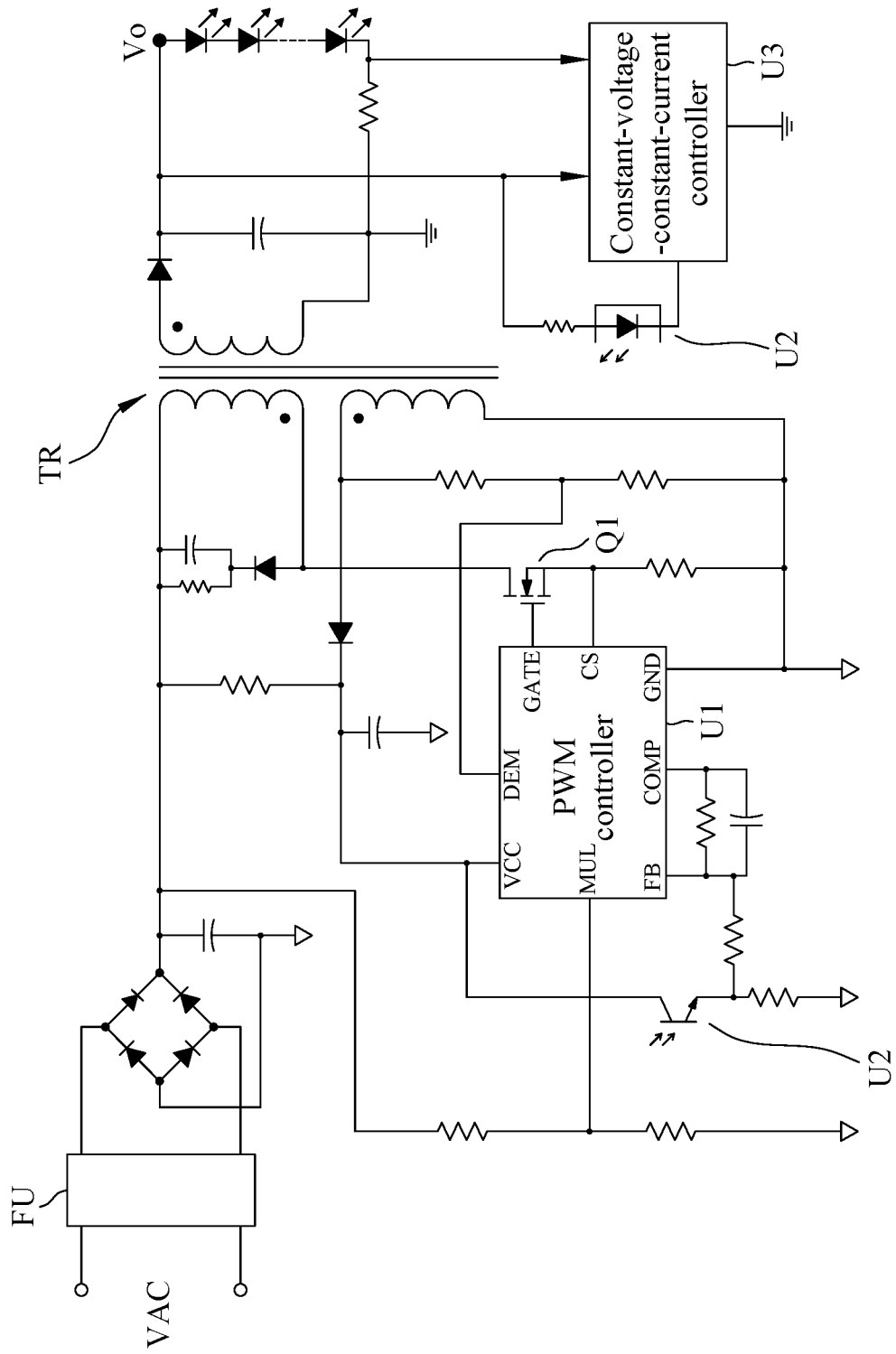
FIG. 2 is a view showing another isolated power conversion system in the prior arts.

Further, the first end P1, the third end P3 and the fourth end P4 of the second PWM controller 32 are employed to detect the voltage/current of the output power Vo so as to perform a compensation control for stabilizing voltage/current, and the second PWM controller 32 also detects voltage drop due to cable loss to implement so called line-end compensation, in which the digital output signal is generated as the digital feedback signal, and transmitted to the signal blocking unit 60 via the transmit end TX. The first PWM controller 31 receives the digital output signal from the signal blocking unit 60, and a feedback loop is thus formed. The above feedback loop replaces the conventional means, which uses the photocoupler to generate and transmit the analog feedback signal to the traditional PWM controller as shown in FIG. 1. Particularly, the second PWM controller 32 is configured to implement the feature of constant voltage/current for the output power Vo. Also, the drawback of slow dynamical loading response caused by the first PWM controller 31 is overcome. In other words, the second PWM controller 32 performs a second control process based on electrical signals from the first end P1, the second end P2, the third end P3, the fourth end P4 and the receive end RX of the second PWM controller 32 so as to generate a secondary coil adjust signal, which is transmitted to the gate of the output transistor Qo via the second end P2. At the same time, a second digital output signal is generated and transmitted from the transmit end TX of the second PWM controller 32 to the receive end RX of the first PWM controller 31 via and the signal blocking unit 60.

The constant voltage/current feature provided by the second PWM controller 32 is particularly suitable to application of charging/discharging control for rechargeable batteries. This is because at the initial stage of charging, the traditional battery has lower voltage and preferably needs constant current charging. When the voltage of the battery reaches the highest value at constant current charging, constant voltage charging is performed and the battery voltage gradually reduced to zero. Thus, the second PWM controller 32 is configured to perform constant current charging at the beginning, and then switch to constant voltage charging as the battery voltage is highest, so as to meet the actual requirement.

Moreover, the second PWM controller 32 can implement the function of synchronous rectifier control. Specifically, during CCM (continuous conduction mode), the synchronous rectifying signal of the first PWM controller 31 received by the receive end RX of the second PWM controller 32 is used to determine the switching transistor 20 is turned on or off such that the synchronous rectifier control is achieved. During DCM (discontinuous conduction mode), the time of turning on the output transistor Qo serving as a synchronous rectifying transistor is based on the synchronous rectifying signal of the first PWM controller 31, and when the current of the secondary coil LS drops to zero, the output transistor Qo is turned off.

Particularly, the signal blocking unit serves as the connection interface between the first PWM controller 31 and the second PWM controller 32 implements digital communication by use of digital signals so as to enhance ability of resisting noise and improve stability of electrical operation.

Figure 5:
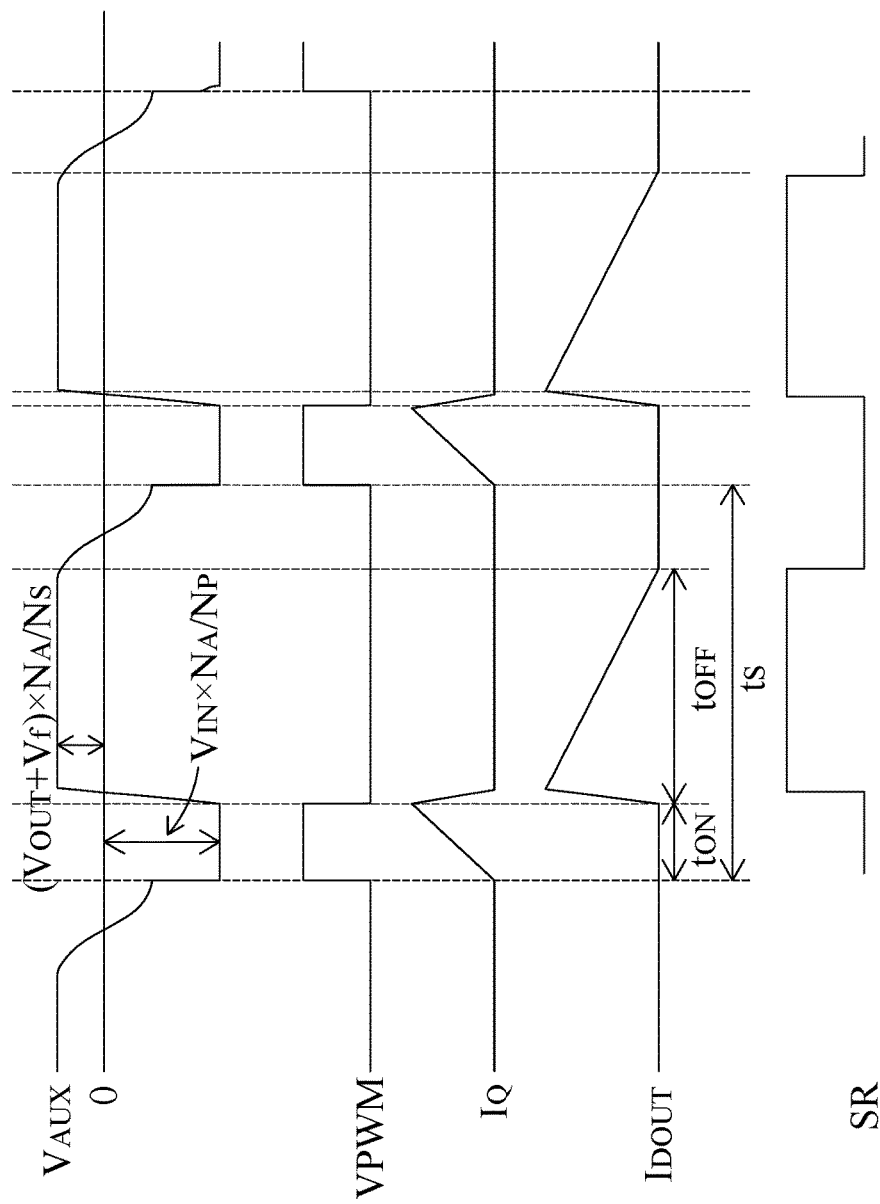
FIG. 5 is an exemplary waveform for electrical operation according to the present invention.

Refer to FIG. 5 illustrating one exemplary waveform for electrical operation of the isolated power conversion system according to the present invention. As shown in FIG. 5, IQ is the conduction current of the primary coil LP, IDOUT is the conduction current of the auxiliary coil LAUX, tON is the time of turning on the primary coil LP, tOFF is the time when IDOU is not zero, and tS is the period of driving signal VPWM. Further, the synchronous rectifying signal SR comes from the receive end RX of the first PWM controller 31.

The above function of synchronous rectification effectively reduces loss caused by the output diode Do at the secondary side so as to increase efficiency of power conversion.

Figure 6:
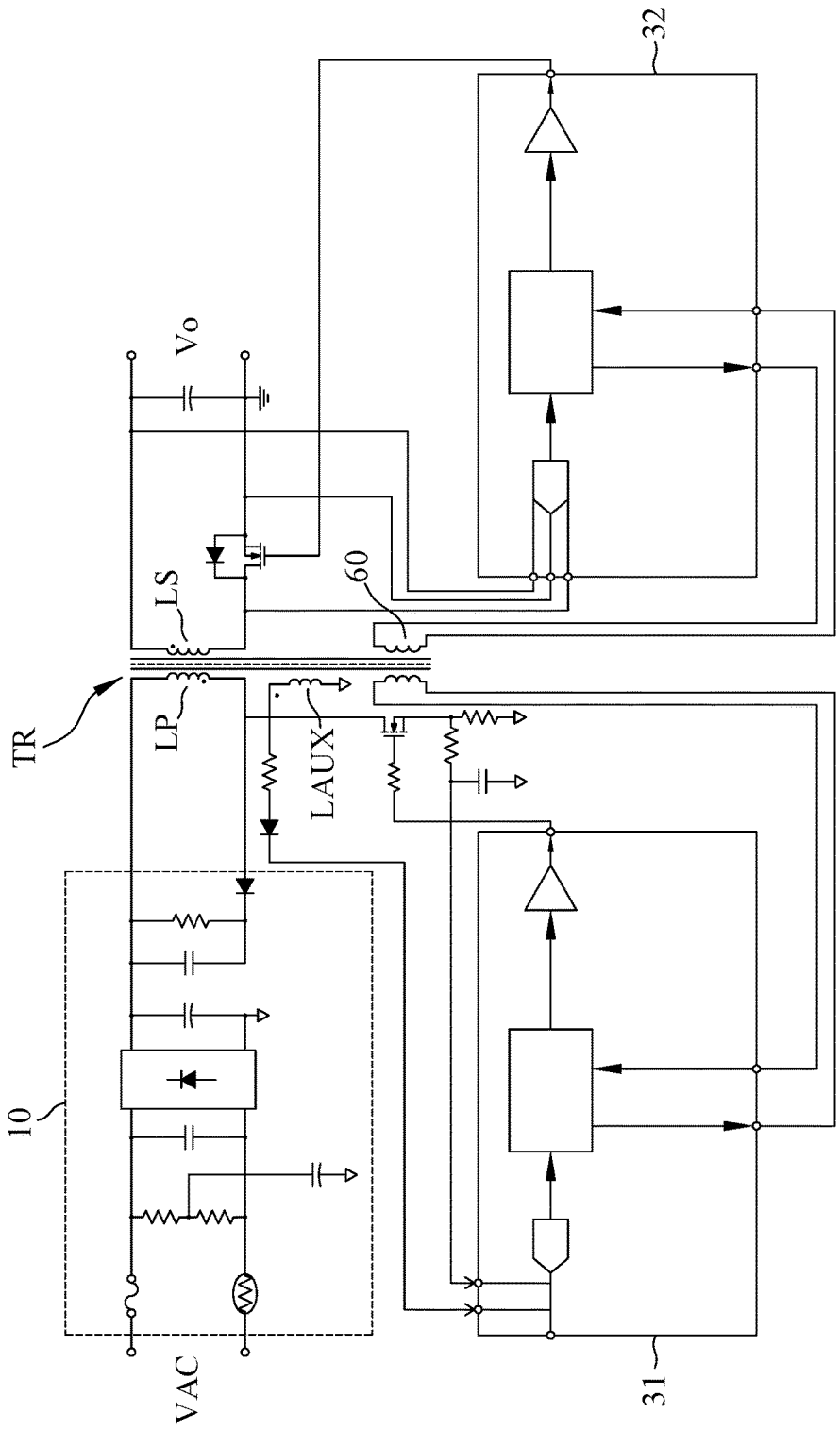
FIG. 6 is an exemplary application for the flyback architecture according to the present invention.

As applied to a flyback architecture as shown in FIG. 6, the present invention employs the signal sensing coil provided the in the transformer TRA as the signal blocking unit 60. In other words, the transformer TRA is a single component integrated with the primary coil LP, the auxiliary coil LAUX, the secondary coil LS and the signal sensing coil. As a result, overall electrical connection of the system is greatly simplified, manufacturing cost becomes more effective, and quality of electrical signal is thus improved.

From the above mention, one primary feature of the present invention is that the isolated power conversion system comprises the first and second PWM controllers with the same functional blocks, and the signal blocking unit is bridged between the first and second PWM controllers. In particular, the first and second PWM controllers perform digital communication through the signal blocking unit to implement the constant voltage/current function. The present invention is suitable for the application field of battery charging/discharging. Also, power factor correction (PFC) is provided to reduce or eliminate virtual work, thereby improving conversion efficiency.

Since the signal blocking unit is employed as the digital communication interface between the first and second PWM controllers, ability of resisting noise is enhanced, the preset electrical operation of the system is secured, and stability of overall system operation is stabilized with higher reliability. Particularly, the present invention is applicable to various electrical architecture of power conversion such as forward, flyback, full bridge, half bridge, boost and buck, so as to effectively expand application field and possess industrial utility.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An isolated power conversion system, comprising:
   a rectifying unit for converting an AC power into a DC power;
   a transformer comprising a primary coil, an auxiliary coil and a secondary coil, the primary coil receiving the DC power, the auxiliary coil generating an auxiliary induced current by induction of a current flowing through the primary coil, the auxiliary induced current flowing through a serial resistor and generating an auxiliary signal, the secondary coil generating a secondary induced current by induction of the current flowing through the primary coil;
   a switching transistor implemented by a MOS (metal-oxide-semiconductor) transistor with a drain, a gate and a source or a BJT (bipolar junction transistor) with a collector, a base and an emitter, the drain or the collector connected to the primary coil, the gate or the base connected to an end of a sensing resistor, another end of the sensing resistor grounded, the source or the emitter generating a sensing signal;
   an output unit comprising an output transistor, an output diode and an output capacitor, a positive end of the output diode connected to a drain of the output transistor and an end of the output capacitor, a negative end of the output diode connected to a source of the output transistor, another end of the output capacitor connected to the secondary coil, the output capacitor connected to a load in parallel for generating an output power;
   a first Pulse Width Modulation (PWM) controller having a first end, a second end, a third end, a fourth end, a transmit end and a receive end, the first end floating, the second end connected to the gate or the base of the switching transistor through a driving serial resistor, the third end receiving the auxiliary signal, the fourth end connected to the source or the emitter of the switching transistor through a sensing serial resistor for receiving the sensing signal;
   a second PWM controller having a first end, a second end, a third end, a fourth end, a transmit end and a receive end, the first end connected to the negative end of the output diode, the second end connected to the gate of the output transistor, the third end connected to the positive end of the output diode, the fourth end connected to the load; and
   a signal blocking unit connected between the first and second PWM controllers, and implemented by a signal sensing coil provided in the transformer to perform bi-directional signal communication for the primary and secondary coils,
   wherein the first PWM controller performs a first control process based on the sensing signal and the auxiliary signal and electrical signal from the receive end to generate a driving signal with a PWM feature, the second end of the first PWM controller transmits the driving signal to the gate or the base of the switching transistor to drive the switching transistor, the first PWM controller generates a first digital output signal, the transmit end of the first PWM controller transmits the first digital output signal to the receive end of the second PWM controller through the signal blocking unit, the second PWM controller performs a second control process based on electrical signals from the first, third, fourth ends and receive end of the second PWM controller so as to generate a secondary coil adjust signal, the second end of the second PWM controller transmits the secondary coil adjust signal to the gate of the output transistor, the second PWM controller generates a second digital output signal, the transmit end of the second PWM controller transmits the second digital output signal to the receive end of the first PWM controller through the signal blocking unit, and connection interface provided for the signal blocking unit to communicate with the first and second PWM controllers is operated by signals in a digital form.

2. The isolated power conversion system as claimed in claim 1, wherein the first PWM controller comprises a digital controller, a PWM driver and an ADC (analog-to-digital converter), the digital controller is implemented by a CPU (central processing unit) or a MCU (microcontroller) executing a software of firmware program, the digital controller is electrically connected to the PWM driver and the ADC, the digital controller receives a digital input signal from the receive end of the first PWM controller and transmits the digital input signal via the transmit end of the first PWM controller, the first, third and fourth ends of the first PWM controller are connected to the ADC for converting analog signals from the first, third and fourth ends into corresponding digital signals to provide the digital controller to generate a digital PWM driving signal, and an input end of the PWM driver receives the digital PWM driving signal such that an analog driving signal is generated by the PWM driver and transmitted to the second end of the first PWM controller through an output end of the PWM driver.

3. The isolated power conversion system as claimed in claim 2, wherein the digital controller of the first PWM controller implements the first control process to achieve features of PFC (power factor correction) and/or LLC.

4. The isolated power conversion system as claimed in claim 1, wherein the second PWM controller comprises a digital controller, a PWM driver and an ADC, the digital controller is implemented by a CPU or a MCU executing a software of firmware program, the digital controller is electrically connected to the PWM driver and the ADC, the digital controller receives a digital input signal from the receive end of the second PWM controller and transmits the digital input signal via the transmit end of the second PWM controller, the first, third and fourth ends of the second PWM controller are connected to the ADC for converting analog signals from the first, third and fourth ends into corresponding digital signals to provide the digital controller to generate a digital PWM driving signal, and an input end of the PWM driver receives the digital PWM driving signal such that an analog driving signal is generated by the PWM driver and transmitted to the second end of the second PWM controller through an output end of the PWM driver.

5. The isolated power conversion system as claimed in claim 4, wherein the digital controller of the second PWM controller is employed to implement the second control process so as to achieve features of constant voltage, constant current and synchronous rectification and line-end compensation.

* * * * *